United States Patent [19]

Maitani et al.

[11] 4,273,434
[45] Jun. 16, 1981

[54] PHOTOGRAPHIC CAMERA

[75] Inventors: Yoshihisa Maitani, Hachioji; Yuichi Sato, Kanagawa, both of Japan

[73] Assignee: Olympus Optical Co., Ltd., Tokyo, Japan

[21] Appl. No.: 59,334

[22] Filed: Jul. 20, 1979

[30] Foreign Application Priority Data

Sep. 14, 1978 [JP] Japan .................................. 53/113370

[51] Int. Cl.$^3$ .............................................. G03B 17/02
[52] U.S. Cl. .................................................... 354/288
[58] Field of Search ............... 354/162, 187, 288, 354, 354/266

[56] References Cited

U.S. PATENT DOCUMENTS 3,015,999  1/1962  Kaden .................................. 354/288
4,019,192  4/1977  Miyagawa .......................... 354/187

FOREIGN PATENT DOCUMENTS 870941   3/1953  Fed. Rep. of Germany ........... 354/288
2803034  8/1978  Fed. Rep. of Germany ........... 354/288

Primary Examiner—L. T. Hix
Assistant Examiner—Thomas H. Tarcza

[57] ABSTRACT

A photographic camera comprises a slide cover fitted to a camera body to be moved between a first position closing an object lens and main finder and a second position opening these members, and a protective douser fitted to the camera finder window when the slide cover is moved to the first position and to open the range finder window when the slide cover is brought to the second position.

5 Claims, 5 Drawing Figures

PHOTOGRAPHIC CAMERA

BACKGROUND OF THE INVENTION

This invention relates to a double-image superimposing type range finder-carrying photographic camera provided with a slide cover slidably mounted on a camera body to protect an object lens and a main finder.

This type of camera which eliminates the necessity of attaching a camera case to the camera body or removing said camera case therefrom, and whose camera case (or cover) can be manufactured at low cost has been developed in the midget form for the general public. Since, however, the camera body has a small lateral length, the slide cover can protect only the main finder and object lens, with the range finder window left exposed.

If an attempt is made to design the slide cover to have a greater lateral length to cover even a range finder window spatially set aside of the main finder, then the difficulties arise that when the object lens and main finder are exposed by moving the slide cover sideways, then that portion of the slide cover which normally encloses the range finder window is brought in front of the object lens and main finder. To prevent such inconvenience, the camera body would have to be made with a greater lateral length. Such attempt would go contrary to the fundamental object of miniaturizing a camera body.

SUMMARY OF THE INVENTION

It is accordingly the object of this invention to provide a camera carrying a slide cover which reliably protects the range finder window without the necessity of enlarging the camera body and enables the range finder window to be opened or closed by an easy operation.

DESCRIPTION OF THE PREFERRED EMBODIMENT

There will now be described by reference to the appended drawing the arrangement and operation of a photographic camera embodying this invention which is provided with a double-image superimposing type range finder.

Figure 1:
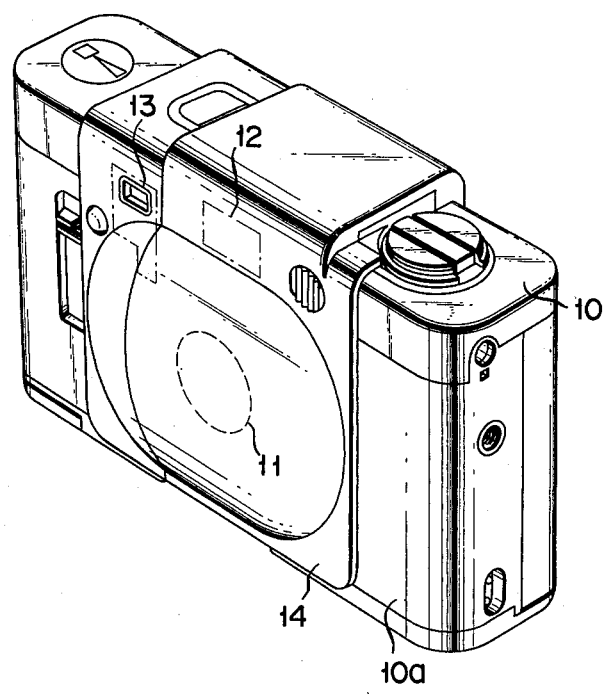
FIG. 1 is an oblique view of the whole of a photographic camera embodying this invention.
Figure 2:
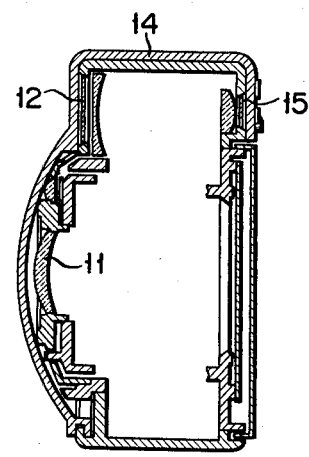
FIG. 2 is a sectional view of said photographic camera.

Referring to FIG. 1, reference numeral 10 denotes the body of a midget camera. An object lens 11 is set substantially at the center of a front board 10a of the camera body. A main finder 12 is disposed above the object lens 11. A range finder window 13 is formed at a prescribed space from the main finder 12. Further, the camera body 10 is provided with a slide cover 14 which can slide between a first position in which the slide cover 14 closes the object lens 11 and main finder 12, and a second position occupied by the slide cover 14 after sliding sideways along the camera body 10 to expose the object lens 11 and main finder 12. In the closing position, the slide cover 14 fully covers the object lens 11 and main finder 12. The slide cover 14 is made wider than the object lens 11 and main finder 12 respectively and narrower than the distance between the object lens 11 and main finder 12 on one hand and the extreme right end wall of the camera body 10 on the other. Where the slide cover 14 is designed to have the abovementioned width, it is substantially impossible with a midget camera to protectively close the range finder window 13 by the slide cover 14. As shown in FIG. 2 the bottom wall of the slide cover 14 is engaged with the bottom wall of the camera body 10, and the upper wall is bent downward to face the backside of the camera body 10, thereby closing an eyepiece window 15 when the slide cover 14 takes a closing position. Built in the camera body 10 is the known double-image superimposing type range finder (not shown) for automatically measuring a distance between the camera body 10 and a foreground object from the light beams which the camera user receives from said foreground object through the main finder 12 and range finder window 13.

Figure 3:
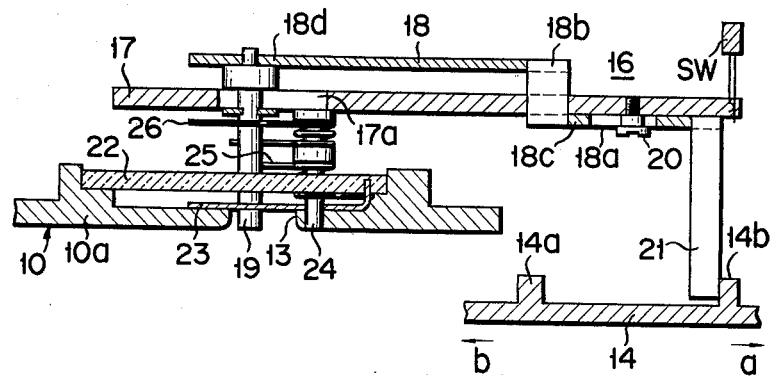
FIG. 3 is a sectional view of a range finder window-closing mechanism used with the same.

According to this invention, the range finder window 13 of the camera body 10 is provided with a mechanism 16 (shown in FIGS. 3 and 4) which is formed of a protective cover and coupling device to close the range finder window 13. The range finder window-closing mechanism 16 comprises a shutter base board 17 fixed in the camera body 10 substantially in parallel with the front board 10a of the camera body 10 at a prescribed space and a slide board 18 capable of sliding sideways along said shutter base board 17. The slide board 18 comprises a slide pin 19 which protrudes from said slide board 18 toward the front side of the camera body 10 and a long horizontally extending hole 18a (best shown in FIG. 4). The slide pin 19 is slidably inserted into a long horizontally extending hole 17a of the shutter base board 17. A pin 20 fixed to the shutter base board 17 is inserted into the aforesaid long horizontally extending hole 18a. Thus, the slide board 18 is slidably supported on the shutter base board 17. The slide board 18 is divided into the forward section 18c and rear section 18d with a bent or stepped portion 18b taken as the boarder. The aforesaid long horizontally extending hole 18a is formed in the forward section 18c. The underside of the right end portion of the forward section 18c is fitted with an arm 21 which protrudes downward from the camera body 10 to engage the slide cover 14. The backside of the slide cover 14 is provided with a pair of engagement projections 14a, 14b arranged at a prescribed space from each other. When the slide cover 14 is moved in the direction of the indicated arrow a one engagement projection 14a abuts against the arm 21, causing the slide board 18 to slide in the same direction. When the slide cover 14 slides in the direction of the indicated arrow b to take a closing position, the slide board 18 is moved in the same direction by the abutment of the arm 21 against the other projection 14b.

The slide pin 19 is fixed to the section 18d of the slide board 18 which lies behind the shutter base board 17, and is extended along the underside of a cover glass 22 of the range finder window 13. The outer side of the arm member formed in the lower end portion of the cover 23 abuts against the peripheral surface of the downward extended end portion of the slide pin 19 to restrict the rotation of the cover 23. In other words, the right side end portion of the cover 23 is pivoted to a fixed pin 24 to rotate on a vertical plane. Said right side end portion of the cover 23 is normally urged by a spring 25 to be rotated in the direction of an arrow c indicated in FIG. 4 for abutment against the slide pin 19. When taking the first or closing position shown in FIG. 4, the cover 23 covers the range finder window 13, that is, the required part of the cover glass 23 for protection. When rotated in the direction of the arrow c of FIG. 4 to take the second or exposing position, the cover 23 opens the range finder window 13 for operation. Reference numeral 26 of FIG. 4 denotes a spring for urging the slide pin 19 to keep the cover 23 in a position covering the range finder window 13.

A normally closed switch SW is fitted to the side edge of the forward section 18c of the slide board 18. While being closed, the switch SW renders a shutter-releasing circuit inoperative. Only when opened, the switch SW actuates said shutter-releasing circuit. Where the slide board 18 is moved in the direction of the arrow a (FIG. 3), the switch SW is left open when the movement of the slide board 18 is substantially brought to an end. Consequently, the shutter can be released only when the slide cover 14 is fully opened.

Figure 4:
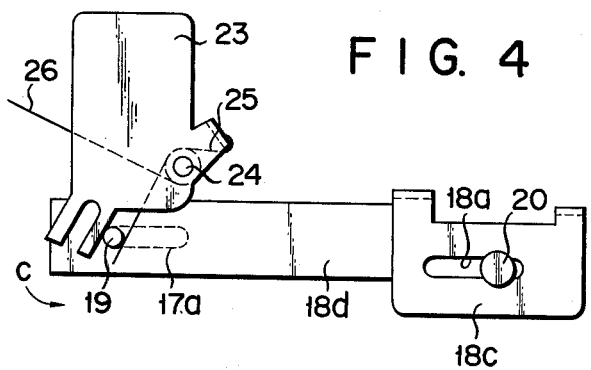
FIG. 4 is a front view of the same, showing the protective cover and of said range finder window-closing mechanism and a slide board.

When, with the photographic camera of this invention arranged as described above, the slide cover 14 is moved in the direction of the arrow a to open the main finder 12, the slide board 18 is also moved in the same direction, causing the slide pin 19 to run through the long horizontal hole 17a (FIG. 4). As a result, the cover 23 is rotated about the fixed pin 24 by the urging force of the spring 25 in the direction of the arrow c to release the range finder window 13 from its closed state. Thus, the range finder window 13 is made ready for operation, as are the object lens 11 and main finder 12. When the camera of this invention is not used, the slide cover 14 is moved in the direction of the arrow b (FIG. 4) to close the object lens 11 and main finder 12. At this time, the cover 23 is operated in the opposite direction to that in which said cover 23 was previously operated for photographing, thereby closing the range finder window 13.

Figure 5:
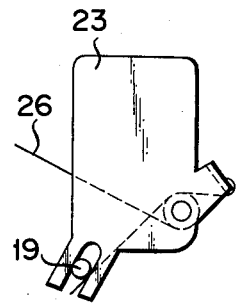
FIG. 5 is a fractional front view of a modification of the range finder window-closing mechanism of FIG. 3.

The foregoing description refers to the case where the rotation of the slide pin 19 was restricted by the abutment of the outside of the arm member formed in the lower end portion of the cover 23 against the peripheral surface of the slide pin 19. However, it is possible, as illustrated in FIG. 5, to insert the slide pin 19 between a pair of arm members formed in the lower end portion of the cover 23 to carry out the same operation as previously described.

With a photographic camera according to the foregoing embodiment, the range finder window 13 was closed and opened by the rotation of the cover 23. However, the operation of the range finder window 13 may be effected by any other form of movement of the cover 23, for example, a linear movement. Further, it is possible to replace the slide board 18 for moving the cover 23 in response to the slide of the slide cover 14 by any other type, for example, a rotary arm.

When, with the photographic camera of this invention, the slide cover protectively closes the object lens and main finder, the range finder window is also reliably protected, as previously described, by being closed with the cover. When the slide cover is moved to open the object lens and main finder, the range finder window is also opened ready for photographing. All these operations can be easily carried out, and moreover the range finder window can be effectively closed, for example, by the protective cover when the photographic camera is not used, even though it may be miniaturized.

What we claim is:

1. In a photographic camera whose body is provided on one side with an object lens, a main finder and a range finder window and on the other with an eyepiece window and which carries a double image-superimposing type range finder, the improvement comprising:
   a slide cover fitted to the camera body and adapted to be moved linearly lengthwise thereof between a first position closing the object lens and main finder and a second position opening the object lens and main finder;
   a protective cover fitted to and rotatably mounted on the camera body and adapted to be moved between a first position closing the range finder window and a second position opening said range finder window; and
   a coupling mechanism resiliently operatively interconnecting the slide cover and protective cover to cause the protective cover to take the first and second positions when the slide cover is moved to the first and second positions.

2. The photographic camera according to claim 1, wherein the slide cover closes the eyepiece window in the first position and opens said eyepiece window in the second position.

3. The photographic camera according to claim 1, wherein the coupling mechanism comprises:
   a slide board which is mounted on the camera body and, when the slide cover is moved, slides in the same direction;
   a spring for urging the protective cover to rotate it to the second position; and
   a support member which is formed on the slide board, and, when the slide board takes the first position, supports the protective cover in the first position against the urging force of the spring.

4. In a photographic camera, comprising a camera body, an object lens provided in one wall of the camera body, a main finder provided in said one wall, a range finder window provided in said one wall a prescribed distance apart from the main finder in the longitudinal direction of the camera body, and an eyepiece window provided in another wall of the camera body opposite to said one wall, a double image-superimposing type range finder being formed by the range finder window and the eyepiece window, the improvement which comprises
   a slide cover mounted to the camera body and slidable between a first position in which the object lens and the main finder are closed and a second position in which the object lens and the main finder are opened,
   a pair of engagement projections disposed a prescribed distance apart from each other on the rear wall of the slide cover, the distance between said projections being somewhat smaller than that between the first and second positions of the slide cover,
   a protective cover mounted to the camera body and movable between a first position in which the range finder window is closed and a second position in which the range finder window is opened,
   a slide board provided with an arm which is pushed by the engagement projections when the slide cover has been moved to the first and second positions, and a spring member for resiliently joining the slide board and the protective cover, whereby the protective cover is moved to the second position when the slide cover has been opened completely.

5. In a photographic camera, comprising a camera body, an object lens provided in one wall of the camera body, a main finder provided in said one wall, a range finder window provided in said one wall a prescribed distance apart from the main finder in the longitudinal direction of the camera body, and an eyepiece window provided in another wall of the camera body opposite to said one wall, a double image-superimposing type range finder being formed by the range finder window and the eyepiece window, the improvement which comprises:

a slide cover mounted to the camera body and slidable between a first position in which the object lens and the main finder are closed and a second position in which the object lens and the main finder are opened, a pair of engagement projections disposed a prescribed distance apart from each other on the rear wall of the slide cover, the distance between the projections being somewhat smaller than that between the first and second positions of the slide cover, a protective cover mounted to the camera body and movable between a first position in which the range finder window is closed and a second position in which the range finder window is opened, a slide board provided with an arm which is pushed by the engagement projections when the slide cover has been moved to the first and second positions, a switch disposed adjacent to the slide board and opened when the slide cover has been moved to the second position, the shutter release function being possible only when the switch is left open, a spring member for resiliently joining the slide board and the protective cover, whereby the shutter can be released only when the slide cover has been moved to reach the second position.

* * * * *